US008458265B1

(12) United States Patent
Gailloux et al.

(10) Patent No.: US 8,458,265 B1
(45) Date of Patent: Jun. 4, 2013

(54) METHOD AND COMPUTER-READABLE MEDIUM FOR SOCIAL NETWORK AUDIO EXCHANGE WITH PUSH-TO-TALK

(75) Inventors: Mike Gailloux, Overland Park, KS (US); Michael Kirk-Chung Ling, Laguna Beach, CA (US); Devon Leon Biere, Olathe, KS (US); Michael William Kanemoto, Lakewood, CO (US)

(73) Assignee: Nextel Communications Inc., Reston, VA (US)

( * ) Notice: Subject to any disclaimer, the term of this patent is extended or adjusted under 35 U.S.C. 154(b) by 340 days.

(21) Appl. No.: 12/400,887

(22) Filed: Mar. 10, 2009

(51) Int. Cl.
*G06F 15/16* (2006.01)

(52) U.S. Cl.
USPC .......... 709/206

(58) Field of Classification Search
USPC .......... 709/203, 206
See application file for complete search history.

(56) References Cited

U.S. PATENT DOCUMENTS

| | | | | |
|---|---|---|---|---|
| 6,335,962 | B1 * | 1/2002 | Ali et al. | 379/88.11 |
| 2005/0064852 | A1 | 3/2005 | Baldursson | |
| 2006/0184674 | A1 | 8/2006 | Izdepski | |
| 2006/0282408 | A1 | 12/2006 | Wisely et al. | |
| 2007/0019616 | A1 * | 1/2007 | Rantapuska et al. | 370/352 |
| 2008/0043943 | A1 * | 2/2008 | Sipher et al. | 379/88.22 |
| 2008/0064373 | A1 * | 3/2008 | Lessing | 455/413 |
| 2008/0153432 | A1 * | 6/2008 | Zhu et al. | 455/90.2 |
| 2009/0316863 | A1 * | 12/2009 | Fitzsimmons | 379/88.11 |
| 2010/0125791 | A1 * | 5/2010 | Katis et al. | 715/716 |
| 2011/0004636 | A1 * | 1/2011 | Parkkinen et al. | 707/803 |
| 2011/0197237 | A1 * | 8/2011 | Turner | 725/78 |

* cited by examiner

*Primary Examiner* — Jason Recek

(57) ABSTRACT

A method and computer-readable medium for posting push-to-talk voice messages on a social networking web page of a user are provided. According to the method, a messaging platform receives a push-to-talk voice message that is addressed to a social networking message service from a mobile station of the user. The messaging platform determines whether an association exists between the mobile station and the social networking web page. When the association exists, the push-to-talk voice message is posted on the social networking web page of the user. The user can listen to the PTT voice messages on his or her social networking web page via the internet.

20 Claims, 3 Drawing Sheets

METHOD AND COMPUTER-READABLE MEDIUM FOR SOCIAL NETWORK AUDIO EXCHANGE WITH PUSH-TO-TALK

BACKGROUND OF THE INVENTION

Wireless communication networks typically provide a number of different services, such as voice and data communication services. Most wireless communication networks typically offer a single type of voice communication service known as interconnect voice communication services (also referred to as circuit-switched voice communication services). Interconnect voice communication services provide a full-duplex communication between two communication endpoints.

Another type of voice communication service is push-to-talk voice communication service (also referred to as dispatch communication service), which involves a half-duplex communication between two communication endpoints. A push-to-talk call requires floor control to ensure that only one endpoint has permission to talk at any particular time during the call. Push-to-talk communication services have historically been employed in private wireless communication networks by, for example, taxi cab companies or emergency service agencies (e.g., police and fire departments).

One of the most recognized advantages of push-to-talk calls compared to interconnect calls is the fast call setup time. For example, push-to-talk calls are typically setup in less than one second, whereas interconnect calls may not even begin to ring the called party in this time. Private wireless communication networks and the iDEN network are able to provide push-to-talk calls with a fast setup time because these networks are specifically designed to provide these types of calls.

Another technology that has become increasingly popular is social networking web sites/services, such as those provided by MySpace, Inc., Facebook, Inc., and the like. Social networking web sites provide users an avenue to create their own social networking web page, which is accessible via the Internet. By creating his or her own web page, a user can post information about himself or herself and allow other users to join the web page as social network connections (e.g., friends or business contacts). With an ever-expanding network of connections, a user's social network can continue to grow over time Social networking services can be used for connecting with friends, business networking, dating, finding online music, etc.

With social networking web services, users can upload text, pictures, songs, and videos from their computers to their social network web pages. However, social networking web site users cannot post voice messages from their push-to-talk mobile devices on their social networking web pages, and thus cannot take advantage of the speed of push-to-talk calling for posting voice messages on the social networking web site. Thus, the prior art suffers from the problem of limiting the utility and interoperability of push-to-talk calling and social network web services.

SUMMARY OF THE INVENTION

The present invention solves the above-mentioned problem of the prior art by providing a method and computer-readable medium that allow users to transmit push-to-talk (PTT) voice messages from their mobile devices to their social networking web pages and have the transmitted voice messages posted on their personal web page. Once the PTT voice messages are posted on the web page, a user can listen to the messages by selecting them via the web page. Moreover, if the user has a plurality of voice messages posted on his or her web page, he or she can listen to all of them as a single thread via one-click selection. Alternatively, the social networking web service may allow certain approved third parties (e.g., friends of the user) to post their PTT voice messages on the user's web page as well as their own web pages.

The method according to the present invention allows users to easily and quickly post and play back PTT voice messages on their social networking web pages. This will significantly improve the utility of the user's PTT calling and social networking experience.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
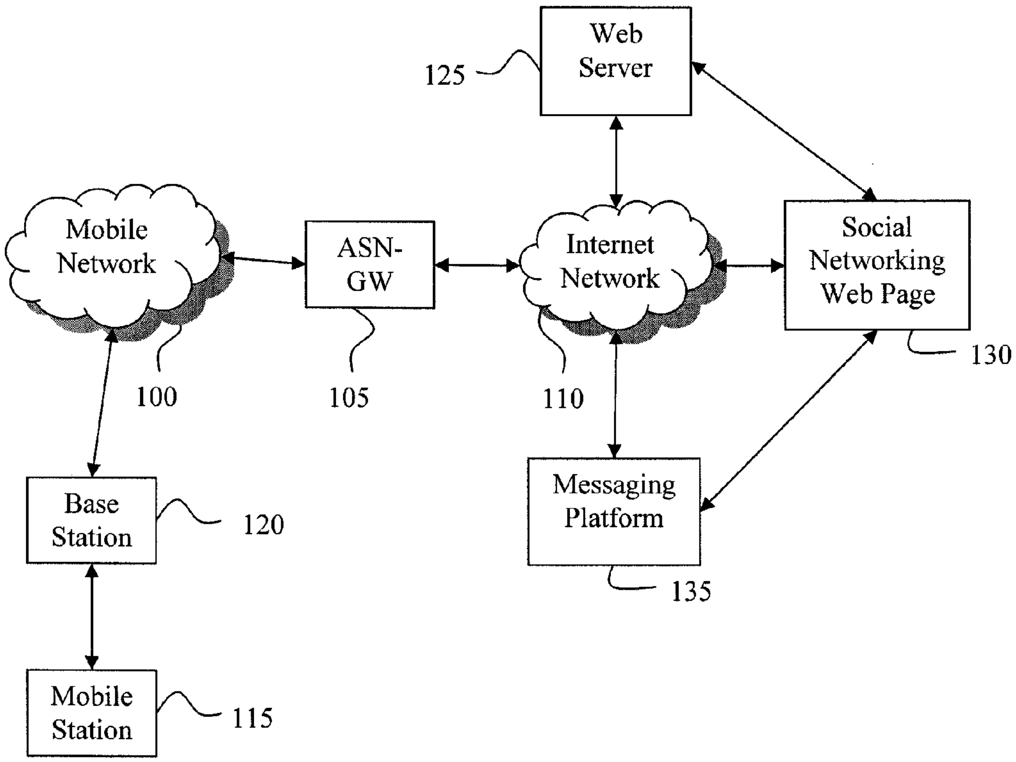
FIG. 1 illustrates an exemplary embodiment of a system in accordance with the present invention.

FIG. 1 illustrates an exemplary embodiment of a system in accordance with the present invention. The system includes a Mobile Network 100, Access Service Network Gateway (ASN-GW) 105, and an Internet Network 110. Mobile Station 115 communicates in the Mobile Network 100 via an air interface through the Base Station 120. The Mobile Station 115 may be a mobile telephone or the like that has the capability to perform push-to-talk communications. The number of components illustrated in FIG. 1 is only exemplary, since the number of components (e.g., mobile stations) can be varied as desired.

The Access Service Network Gateway (ASN-GW) 105 connects the Mobile Network 100 to the Internet Network 110 and acts as a traffic aggregation point within the system. Connected to the Internet Network 110 are a Web Server 125, Social Networking Web Page 130, and a Messaging Platform 135. The Web Server 125 is provided by a push-to-talk service provider to facilitate internet communications for mobile stations in the Mobile Network 100. Each user can have his own Social Networking Web Page 130, such as a MySpace® page or a Facebook® page, provided by a social networking service provider. The Messaging Platform 135, which may also be provided by the social networking service provider, is an application that receives push-to-talk voice messages from users and forwards them to the social networking web pages of the users for display as a link. When the link is activated, e.g., by "clicking" on the link, the push-to-talk message is retrieved from Messaging Platform 135.

Figure 2:
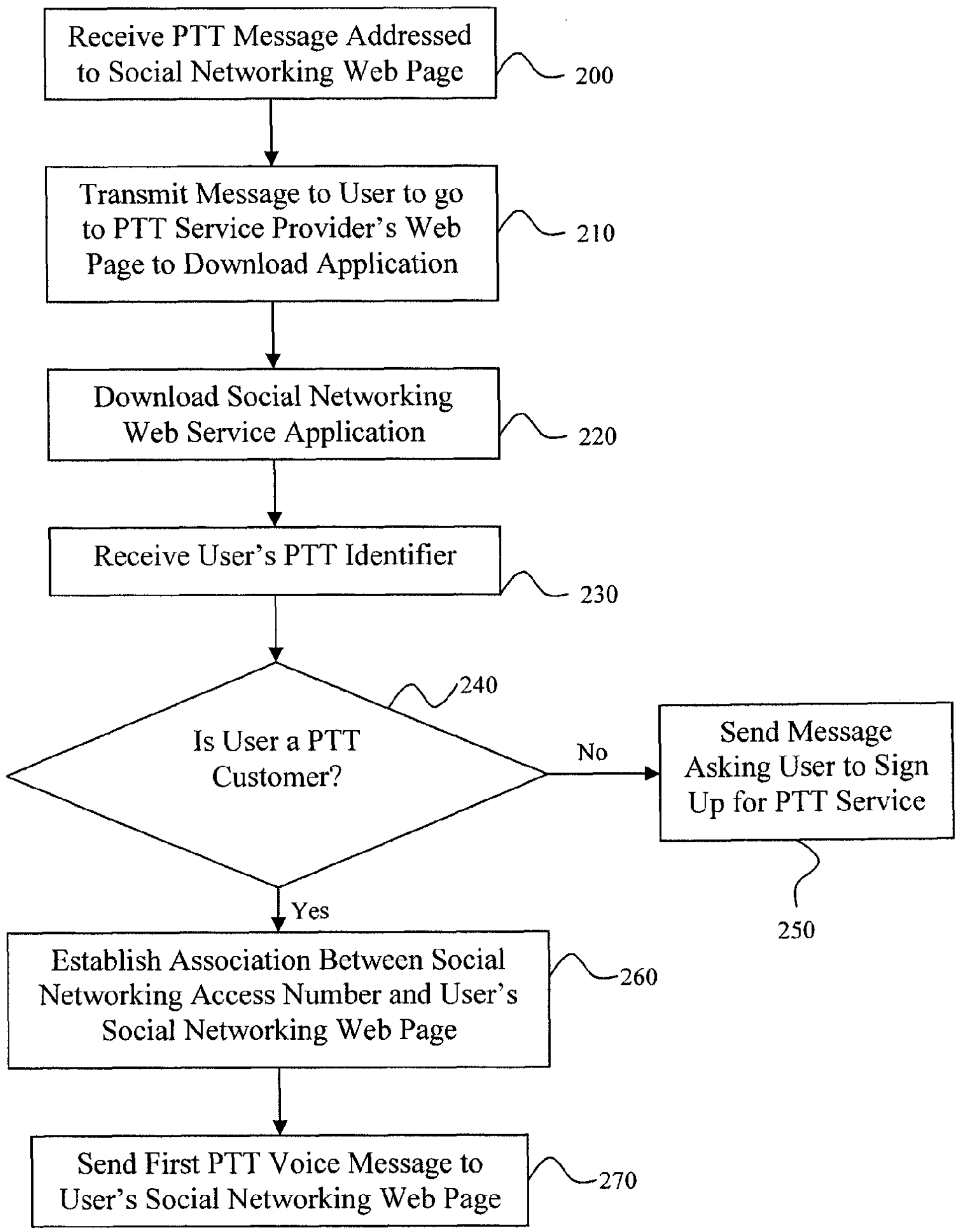
FIG. 2 illustrates an exemplary embodiment of a method for establishing push-to-talk voice message service, provided by a service provider, for a social networking web page of a user, in accordance with the present invention.

FIG. 2 illustrates an exemplary embodiment of a method for establishing push-to-talk voice message service, provided by a service provider, for the Social Networking Web Page 130 of a user. In step 200, the Web Server 125 receives a push-to-talk voice message from a user (e.g., Mobile Station 115) that is intended for posting on the Social Networking Web Page 130. For example, the user sends the message to an address such as "123*MY*SPACE".

In response to such a request to access the social networking web service, in the case that the user does not already have the service, in step 210, the Web Server 125 transmits a message to the user to go to the push-to-talk service provider's web site and download the social networking application to the Mobile Station 115 for posting push-to-talk voice messages. Alternatively, the user can be directed to the social networking service provider's web site to download the application to the Mobile Station 115. Both of these web sites would provide an explanation to the user what the application is and how it works. Additionally, non-users could be invited to use the service via a social networking peer-to-peer method.

Once the application has been downloaded, a single instance of the application can be present on a plurality of social network user pages concurrently. For example, a group of friends within the social network could establish the single instance of the application. The same group of PTT users or a link to the group can be displayed across multiple social networking pages.

In step 220, the user downloads the social networking application, which will allow the user to post his or her push-to-talk voice messages on his or her Social Networking Web Page 130. As part of the process of establishing the push-to-talk voice message posting service, in step 230, the user provides a push-to-talk identifier for his/her Mobile Station 115 (e.g., the push-to-talk phone number or Urban Fleet Mobile ID (UFMID) for the Mobile Station 115) to the Web Server 125. Additionally, the user would need to review and agree to various terms and conditions of use for the service.

In step 240, the Web Server 125 determines whether the user is a customer of the push-to-talk service provider, based upon the push-to-talk identifier of the Mobile Station 115. If the user is not a current customer of the service provider's push-to-talk service, a message is sent to the user (step 250) informing him or her how to sign up for the service.

If the user is a current customer of the service provider's push-to-talk service, in step 260, the Web Server 125 establishes an association between the social networking address (e.g., 123*MY*SPACE) and the user's Social Networking Web Page 130. For example, the association may be established in a database of the PTT service provider. In step 270, the service provider sends a first push-to-talk voice message to the user's Social Networking Web Page 130, so that the user can begin to experience the service.

Figure 3:
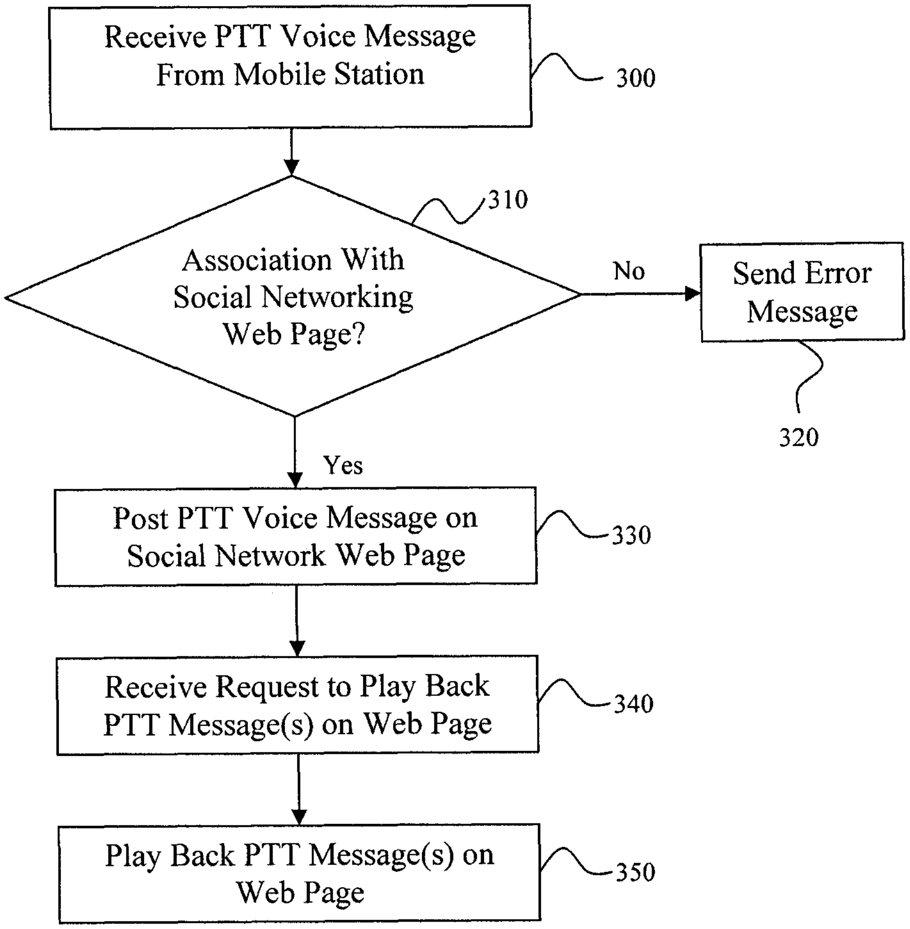
FIG. 3 illustrates an exemplary embodiment of a method for posting push-to-talk voice messages on a social networking web page of a user, in accordance with the present invention.

FIG. 3 illustrates an exemplary embodiment of a method for posting push-to-talk voice messages on a social networking web page of a user, in accordance with the present invention. In step 300, a push-to-talk voice message is received by the Messaging Platform 135 via Base Station 120, Mobile Network 100, ASN-GW 105 and Internet Network 110. Based upon the push-to-talk identifier of the Mobile Station 115, which is included in a header of the voice message, in step 310, the Messaging Platform 135 determines whether the Mobile Station 115 is associated with the user's Social Networking Web Page 130 for which the voice message is intended. In particular, the association may be between a mobile IP address of the Mobile Station 115 and the Social Networking Web Page 130. In step 320, if the association does not exist, an error message is sent to the Mobile Station 115 to inform the user that the push-to-talk voice message cannot be posted to the intended Social Networking Web Page 130.

If the association between the Mobile Station 115 and the user's Social Networking Web Page 130 does exist, then in step 330, the push-to-talk voice message is posted on the Social Networking Web Page 130 as a link to a file stored on Messaging Platform 135. In an exemplary embodiment of the invention, the audio format of the PTT voice message is changed to an audio format (e.g., .wav, .aiff, .mpa, .mp2, .mp3, .gsm) that is compatible with, or provides improved sound quality on, the Social Networking Web Page 130, prior to posting the voice message. A plurality of PTT messages and/or links to PTT messages can be posted on the Social Networking Web Page 130.

In step 340, the Social Networking Web Page 130 receives a request to play back messages posted on the Social Networking Web Page 130 and retrieves the corresponding file stored on Messaging Platform 135. In particular, the user to whom the Social Networking Web Page 130 belongs, or another authorized user of that web page, may play back the voice messages by accessing the Social Networking Web Page 130 via the internet.

In step 350, the messages can be played back as a single thread of messages in the order in which they were posted, or any other order established by the user. Additionally, the messages can be displayed on a user interface (e.g., computer screen) in any order desired. The push-to-talk voice messages can be played back using the audio settings on the user's computer, and the playing back of the messages should not cause a page transition. The messages could be selected with a single click of an icon representing them, or a playback button of an audio program or the like on the Social Networking Web Page 130. Users could be classified as authorized users based upon whether they are registered as "friends," for example, of the user to whom the Social Networking Web Page 130 belongs. Also, a user could send a posted push-to-talk voice message to another user via a message constructed in the social networking environment.

For a group of friends, when a new push-to-talk voice message is posted on the web pages of the group, an email can be automatically sent to all of the friends to notify them of the newly posted push-to-talk voice message. Also, users can be informed of the status of operation of the service on their Social Networking Web Page 130. This status information, as well as other information about the service, can be displayed as a scrolling message on a user interface, e.g., computer screen. The push-to-talk service provider would be able to set the scrolling message via its own user interface.

In an alternative embodiment of the method, each of a plurality of posted push-to-talk voice messages can be played back individually. In particular, an authorized user of the Social Networking Web Page 130 may play back any of the messages one at a time. Each of the voice messages could have its own icon or menu item that the authorized user could click to play back any selected message, or a playback button of an audio program could be clicked.

In an exemplary embodiment of the method, a user can launch a separate browser window from the main messaging application display to obtain additional information regarding the service, such as detailed descriptions of the various aspects of the service, troubleshooting information, etc. Also, a dropdown menu or the like containing dynamic URLs is available to the user for obtaining additional information.

In an exemplary embodiment of the method, a user can post its push-to-talk voice messages on a local area blog for display and play back to an audience within a small physical area of the sender of the message. A WiFi network, for example, could be used for this purpose. In another exemplary embodiment of the method, the posting of push-to-talk voice messages via social networking web site is done publicly in a local area, such as a bar environment.

Also, a user of the push-to-talk voice message/social networking web site service can invite his or her contacts to download the application and use the service. An additional feature of the service is the collection of data regarding users' use of the service.

In other exemplary embodiments of the present invention, there is a computer-readable medium encoded with a computer program for establishing push-to-talk voice message service, provided by a service provider, for a social networking web page of a user, and a computer-readable medium encoded with a computer program for posting push-to-talk voice messages on a social networking web page of a user. The term "computer-readable medium" as used herein refers to any non-transitory medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

An exemplary embodiment of a computer-readable medium encoded with a computer program for establishing push-to-talk voice message service, provided by a service provider, for a social networking web page of a user is illustrated in FIG. 2, which is described above.

An exemplary embodiment of a computer-readable medium encoded with a computer program for posting push-to-talk voice messages on a social networking web page of a user is illustrated in FIG. 3, which is described above.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for posting push-to-talk voice messages on a social networking web page of a user, the method comprising the acts of:

receiving, by a messaging platform, a push-to-talk voice message that is addressed to a social networking message service from a mobile station of the user;

determining whether an association exists between the mobile station and the social networking web page;

posting the push-to-talk voice message on the social networking web page of the user, when the association exists;

automatically sending an email to a group of friends of the user when the push-to-talk voice message is posted on the social networking web page of the user to notify the group of friends that the push-to-talk voice message is posted;

receiving a request, via internet, to play back push-to-talk voice messages posted on the social networking web page; and playing back the push-to-talk voice messages on the social networking web page as a single thread by selecting an icon on the social networking web page representing the single thread of the push-to-talk voice messages;

wherein posting the push-to-talk voice message on the social networking web page comprises converting a first audio format of the push-to-talk voice message to a second audio format compatible with the social networking web page.

2. The method of claim 1, wherein determining whether the association exists comprises verifying that the social networking web page belongs to the user.

3. The method of claim 1, wherein determining whether the association exists comprises determining whether the association exists between a mobile IP address of the mobile station and the social networking web page of the user.

4. The method of claim 1, further comprising the step of:

verifying that the request was received from an authorized user of the social networking web page.

5. The method of claim 1, wherein the second audio format provides better sound quality that the first audio format.

6. The method of claim 1, wherein, when the association does not exist, an error message is sent to the mobile station to inform the user that the push-to-talk voice message cannot be posted.

7. A method for establishing push-to-talk voice message service, provided by a service provider, for a social networking web page of a user, comprising the steps of:

receiving a social networking web site address in a push-to-talk voice message from a mobile station of the user;

downloading a push-to-talk voice message service application to the mobile station;

receiving, from the mobile station, a push-to-talk identifier of the mobile station;

verifying that the user is a customer of the service provider, based on the push-to-talk identifier;

establishing the push-to-talk voice message service, when it is verified that the user is a customer of the service provider;

sending a first push-to-talk voice message to a social networking web page of the user;

automatically sending an email to a group of friends of the user when the push-to-talk voice message is received by the social networking web page of the user to notify the group of friends that the push-to-talk voice message is on the social networking web page of the user;

receiving a request, via internet, to play back push-to-talk voice messages posted on the social networking web page; and playing back the push-to-talk voice messages on the social networking web page as a single thread by selecting an icon on the social networking web page representing the single thread of the push-to-talk voice messages.

8. The method of claim 7, wherein establishing the push-to-talk voice message service comprises setting a record in a database relating the social networking web site address to the social networking web page of the user.

9. The method of claim 7, further comprising the step of:

transmitting an invitation message to the mobile station that invites the user to download a push-to-talk voice message service application to the mobile station, in response to receiving the social networking web site address from the mobile station.

10. The method of claim 7, wherein the second audio format provides better sound quality that the first audio format.

11. The method of claim 7, wherein, when the user is not the customer of the service provider, an error message is sent to the mobile station to inform the user that the push-to-talk voice message cannot be posted.

12. A non-transitory computer-readable medium encoded with a computer program for posting push-to-talk voice messages on a social networking web page of a user, the computer program comprising instructions for:

receiving, by a messaging platform, a push-to-talk voice message that is addressed to a social networking message service from a mobile station of the user;

determining whether an association exists between the mobile station and the social networking web page;

posting the push-to-talk voice message on the social networking web page of the user, when the association exists;

automatically sending an email to a group of friends of the user when the push-to-talk voice message is posted on the social networking web page of the user to notify the group of friends that the push-to-talk voice message is posted;

receiving a request, via internet, to play back push-to-talk voice messages posted on the social networking web page; and playing back the push-to-talk voice messages on the social networking web page as a single thread by selecting an icon on the social networking web page representing the single thread of the push-to-talk voice messages;

wherein posting the push-to-talk voice message on the social networking web page comprises converting a first audio format of the push-to-talk voice message to a second audio format compatible with the social networking web page.

13. The non-transitory computer-readable medium of claim 12, wherein determining whether the association exists comprises verifying that the social networking web page belongs to the user.

14. The non-transitory computer-readable medium of claim 12, wherein determining whether the association exists comprises determining whether the association exists between a mobile IP address of the mobile station and the social networking web page of the user.

15. The non-transitory computer-readable medium of claim 12, further comprising instructions for:

verifying that the request was received from an authorized user of the social networking web page.

16. The non-transitory computer-readable medium of claim 12, wherein the second audio format provides better sound quality that the first audio format.

17. The non-transitory computer-readable medium of claim 12, wherein, when the association does not exist, an error message is sent to the mobile station to inform the user that the push-to-talk voice message cannot be posted.

18. A non-transitory computer-readable medium encoded with a computer program for establishing push-to-talk voice message service, provided by a service provider, for a social networking web page of a user, the computer program comprising instructions for:

receiving a social networking web site address in a push-to-talk voice message from a mobile station of the user;

downloading a push-to-talk voice message service application to the mobile station;

receiving, from the mobile station, a push-to-talk identifier of the mobile station;

verifying that the user is a customer of the service provider, based on the push-to-talk identifier;

establishing the push-to-talk voice message service, when it is verified that the user is a customer of the service provider;

sending a first push-to-talk voice message to a social networking web page of the user;

automatically sending an email to a group of friends of the user when the push-to-talk voice message is received by the social networking web page of the user to notify the group of friends that the push-to-talk voice message is on the social networking web page of the user;

receiving a request, via internet, to play back push-to-talk voice messages posted on the social networking web page; and playing back the push-to-talk voice messages on the social networking web page as a single thread by selecting an icon on the social networking web page representing the single thread of the push-to-talk voice messages.

19. The non-transitory computer-readable medium of claim 18, wherein establishing the push-to-talk voice message service comprises setting a record in a database relating the social networking web site address to the social networking web page of the user.

20. The non-transitory computer-readable medium of claim 18, further comprising instructions for:

transmitting an invitation message to the mobile station that invites the user to download a push-to-talk voice message service application to the mobile station, in response to receiving the social networking web site access number from the mobile station.

* * * * *